UNITED STATES PATENT OFFICE.

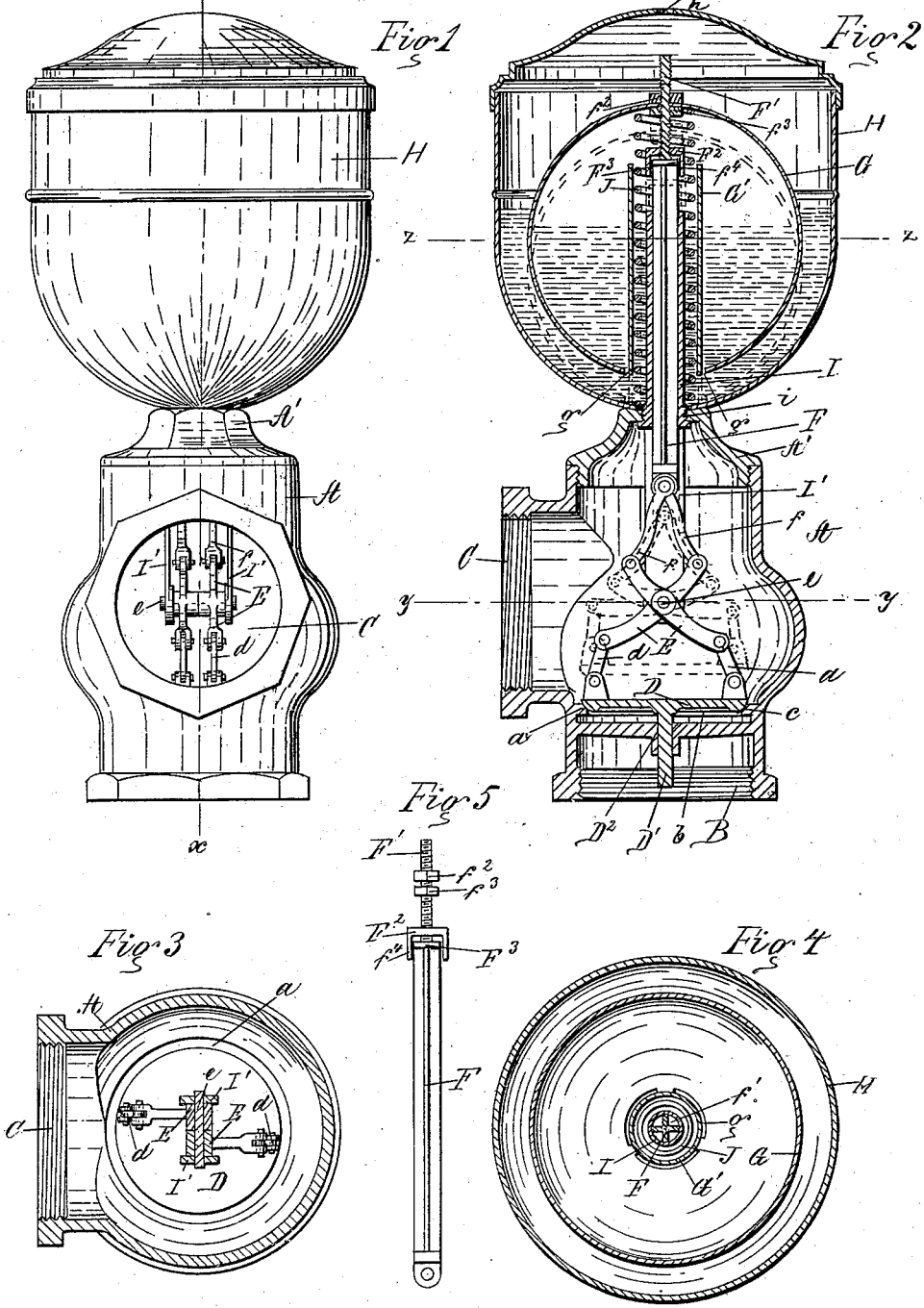

LEWIS G. FRANCIS, OF LA GRANGE, ILLINOIS.

GAS-PRESSURE REGULATOR.

SPECIFICATION forming part of Letters Patent No. 312,560, dated February 17, 1885.

Application filed October 6, 1884. (No model.)

*To all whom it may concern:*

Be it known that I, LEWIS G. FRANCIS, a citizen of the United States, and residing at La Grange, in the county of Cook and State of Illinois, have invented certain new and useful Improvements in Gas-Pressure Regulators, which are fully set forth in the following specification, reference being had to the accompanying drawings, in which—

Figure 1 is an elevation of a device embodying my invention; Fig. 2, a sectional view on the line $x\ x$ of Fig. 1; Fig. 3, a sectional view on the line $v\ v$ of Fig. 2; Fig. 4, a sectional view on the line $z\ z$ of Fig. 2, and Fig. 5 a detail view of the valve-stem.

Like letters refer to like parts in all the figures.

My invention relates to gages or regulators for regulating the pressure of illuminating or other gas in order to furnish a steady flow; and to that end it consists in certain novel features, which I will now proceed to describe, and then specifically point out in the claims.

In the drawings, A represents a valve-casing having inlet B and outlet C, whereby it is adapted to be attached to a meter or inserted in a line of pipe, and provided interiorly with a diaphragm, $a$, having an orifice, $b$, provided with a valve-seat, $c$, at its upper edge for the valve D, the said valve being arranged on the upper side of the diaphragm, as shown. To the under side of this valve is attached a short guide-stem, D', passing through a suitable bracket or support, $D^2$, arranged underneath the diaphragm $a$, as shown in Fig. 2.

Pivoted to the upper side of the valve D, or to lugs thereon, are the links $d$, their other ends being pivoted to levers E, centrally mounted on a fixed pivot, $e$, and having their upper ends connected by links $f$ to the valve-stem F, thereby forming a toggle-connection between the valve and its stem. This stem has secured to its upper extremity a float, G, preferably spherical in shape, and arranged within a case, H.

A' indicates a screw cap or plug attached to the valve-casing A, which is threaded to receive it, and to this screw-cap the case H is soldered or otherwise secured.

In the screw-cap A' is a threaded orifice, $i$, to receive a tube, I, which is threaded, as shown, to screw therein, the said tube forming a guide for the valve-stem, and having at its lower end the arms I', in which the pivot $e$ of the levers E is mounted. The valve-stem F is X-shaped in cross-section, as shown in Fig. 4, being made of sheet metal or other suitable material, thereby leaving grooves or spaces $f'$ between the stem and the tube I, through which the gas may pass up into the float, as hereinafter described. The upper end of the valve-stem is formed into a screw-threaded extension, F', passing through a hole in the float G, and having nuts $f^2 f^3$ thereon, on the outside and inside of the float, respectively, whereby the float may be adjusted on the valve-stem. Washers may be employed at this point, if deemed necessary, to make a gas-tight joint. On this screw-threaded extension, below the nut $f^3$, is adjustably mounted a stop, $F^2$, consisting of a disk having downward-projecting arms $f^4$, which, coming against the upper end of the tube I, prevent the valve-stem from descending too far—*i. e.*, so far that the solid head or collar $F^3$ on the upper end of the body of the valve-stem enters the tube I—in which case it would close the tube and render the device inoperative. The float G is provided with an interior tube, G', attached at its lower end to the orifice through which the tube I enters the float, the tube G' being so attached as to leave spaces $g$, connecting the interior of the float with the interior of the case H, which is to be partially filled with water or glycerine, or some other suitable fluid, which will thus be enabled to flow into and partially fill the float G also. The tube G' acts as a guide or support for a spring, J, the lower end of which bears against the bottom of the case H and the upper one against the under surface of the top of the float, as clearly shown in Fig. 2. This spring serves to aid in raising the float, counteracting the weight of said float and of the attached valve-stem. The case H is provided with a suitable vent-orifice, $h$, as shown in Fig. 2.

The operation of the device is as follows: The valve being normally closed, as shown in the drawings in full lines, by the pressure of the spring J, the gas enters at the inlet B, thereby raising the valve D from its seat, at the same time, by means of the toggle-connection between the valve and its stem, lowering the float G, as shown in dotted lines in Fig. 2, thereby immersing it deeper in the fluid which fills the case H. In case the pressure of the spring is too great, small leaden weights or washers may be placed over the upper projecting end of the valve-stem, thereby causing the valve to operate at any desired pressure. The vent $h$ permits the liquid in the case to rise and fall as the float descends and ascends. The space in the float above the liquid therein is at first filled with air, but eventually becomes filled with gas, which passes up through the tube I along the spaces $f'$ in the valve-stem. Upon any increase in the pressure of the gas the pressure in the upper portion of the float is correspondingly increased and a portion of the liquid in the float is expelled, whereby the float is caused to rise, thus lowering the valve D and bringing it nearer to its seat, which reduces the orifice through which the gas passes, thus lessening the flow of gas. Upon a decrease in the pressure of the fluid again enters the float, which is then lowered to a corresponding extent, thus proportionately raising the valve and increasing the flow. By this means a constantly steady and equal flow of gas at the outlet C is produced.

By reason of the peculiar shape of the valve-stem a free communication between the valve-casing and the interior of the float is obtained, while the danger of the stem clogging with gas-tar and sticking in the tube I is reduced to a minimum, the frictional contact between the two being very slight; but though I have shown this my preferred form of valve-stem, still it is evident that other forms permitting a communication between the valve-casing and float may be employed. It will also be seen that the tube I not only both guides the valve-stem and conducts the gas to the float, but also supports all the moving parts of the device. By attaching this tube and the case H to the screw-cap A', I am enabled to remove the said cap and all the mechanism, for the purpose of inspecting and cleaning it, without the necessity of detaching the valve-casing A from the meter or pipe, the orifice in which the cap fits being of sufficient size to permit such removal. The guide-stem D' aids in steadying the valve D, but is not absolutely necessary, and may be dispensed with, although I prefer to employ it. I have also found that the form of float shown is advantageous in producing a proper action of the gas upon the contents of the float.

I am aware that heretofore gas-pressure regulators have been employed in which a valve is actuated by a float the position of which is controlled by the pressure of the gas; but in the said construction the valve has been located below the seat or on the side thereof next to the inlet, the valve being so connected to the float that it rises and falls therewith to decrease or increase the flow of gas. In such a construction, in case the pipe or meter to which the regulator is attached is jarred or shaken, as it frequently is in factories and elsewhere, the valve will rise suddenly and cut off the flow of gas, thereby extinguishing the light. With my construction, in case of a sudden jar, the valve rises when jarred; but, being above its seat it thereby increases the flow momentarily, the regulator returning to the proper pressure almost immediately. It will also be observed that the valve aids in balancing the float, in conjunction with the spring, thereby rendering the device extremely sensitive to any change in the pressure, however slight. By reason of this construction the "pumping" of the gas, causing an unsteady light, is completely overcome.

It is obvious that various mechanical modifications in the construction shown and described may be made without departing from the principle of my invention, and I therefore do not wish to be understood as limiting myself to the precise details of construction shown and described.

Having thus described my invention, what I claim as new, and desire to secure by Letters Patent, is—

1. In a gas-pressure regulator, the combination, with the valve D and its seat, of the valve-stem F, float G, attached thereto, case H, and a toggle-connection between the said valve and valve-stem, substantially as and for the purposes specified.

2. In a gas-pressure regulator, the combination, with the valve D, arranged above its seat, of the case H, the float G, contained therein, the valve-stem F, connected to the float and working in the tube I, the said stem having a passage or passages to conduct the gas to the float, and a toggle-connection between the said valve and valve-stem, substantially as and for the purposes specified.

3. In a gas-pressure regulator, the combination, with the valve-stem and float, of the valve D, having links $d$, the levers E, mounted on a fixed pivot, $e$, and the links $f$, substantially as and for the purposes specified.

4. In a gas-pressure regulator, the combination, with the valve-stem and valve, of the levers E, connected thereto by links $d$ and $f$, and mounted on a fixed pivot, $e$, and the tube I, forming a guide for the valve-stem, and having arms I', to support the pivot $e$, substantially as and for the purposes specified.

5. In a gas-pressure regulator, the combination, with the valve-casing A, of the removable screw-cap A', having attached thereto the case H, and the tube I, and the mechanism supported thereby, substantially as and for the purposes specified.

6. In a gas-pressure regulator, the combination, with the tube I, of the valve-stem F, X-shaped in cross-section, and having the float G connected to its upper and the valve D to its lower end, substantially as and for the purposes set forth.

7. In a gas-pressure regulator, the combination, with the valve-stem and the mechanism connected therewith, of the stop $F^2$, adjustable on the screw-threaded extension F', and having the arms $f^4$, to engage the end of tube I, substantially as and for the purposes specified.

8. In a gas-pressure regulator, the combination of casing H, float G, contained therein, valve-stem F, attached to said float and having a passage or passages to conduct the gas thereto, tube I, surrounding said valve-stem, and spring J, interposed between the float and case, said valve D arranged above its seat and connected to the valve-stem by toggles, substantially as and for the purposes specified.

LEWIS G. FRANCIS.

Witnesses:
IRVINE MILLER,
ABBIE M. BEST.